United States Patent
Sasaki

(10) Patent No.: US 7,787,701 B2
(45) Date of Patent: Aug. 31, 2010

(54) IMAGE PROCESSING APPARATUS AND APPARATUS CONNECTED TO IMAGE PROCESSING APPARATUS

(75) Inventor: Gen Sasaki, Osaka (JP)

(73) Assignee: Megachips Corporation, Osaka-shi (JP)

( * ) Notice: Subject to any disclaimer, the term of this patent is extended or adjusted under 35 U.S.C. 154(b) by 1014 days.

(21) Appl. No.: 11/533,810

(22) Filed: Sep. 21, 2006

(65) Prior Publication Data

US 2007/0098273 A1 May 3, 2007

(30) Foreign Application Priority Data

Oct. 27, 2005 (JP) .............................. 2005-312806

(51) Int. Cl.
*G06K 9/36* (2006.01)
(52) U.S. Cl. ...................... 382/232; 382/233; 382/240; 382/246
(58) Field of Classification Search ................. 382/232, 382/233, 240, 246; 360/8, 48; 375/368, 375/354; 707/101; 703/28, 13; 348/722; 358/400, 500; 341/67
See application file for complete search history.

(56) References Cited

U.S. PATENT DOCUMENTS 5,764,698 A * 6/1998 Sudharsanan et al. ........ 375/241
7,050,980 B2 * 5/2006 Wang et al. .................. 704/503

* cited by examiner

*Primary Examiner*—Ahn Hong Do
(74) *Attorney, Agent, or Firm*—Oblon, Spivak, McClelland, Maier & Neustadt, L.L.P.

(57) ABSTRACT

When a compression part outputs JPEG data which is discrete in the time direction, the valid data is accumulated in an FIFO. When the valid data of predetermined size is accumulated in the FIFO, an encapsulation part adds markers before and after the valid data and transmits JPEG stream data to a host control module. This stream data includes encapsulated data in which the valid data is encapsulated with the markers and invalid data. The host control module stores this stream data in an SDRAM without any change. Then, by searching data for the markers, the valid data is acquired and the JPEG data is reproduced.

22 Claims, 7 Drawing Sheets

IMAGE PROCESSING APPARATUS AND APPARATUS CONNECTED TO IMAGE PROCESSING APPARATUS

BACKGROUND OF THE INVENTION

1. Field of the Invention

The present invention relates to a technique to transmit compressed image data such as JPEG and JPEG 2000 among modules.

2. Description of the Background Art

With reduction in price and downsizing of an image pickup device, a camera function has been added to various electronic equipment. A camera-equipped mobile phone is one example. FIG. 8 is a block diagram showing a background-art camera-equipped mobile phone 100. The camera-equipped mobile phone 100 comprises a host control module 101 and an image processing module 102.

The host control module 101 is a module to perform data transmission as well as call operation which is an original function of a mobile phone. The image processing module 102 is a module to perform various image processings on image data inputted from an image pickup element (not shown). For example, a color interpolation, a color space conversion, a gamma conversion and/or the like are performed. The image processing module 102 comprises a function to compress image data with JPEG or JPEG 2000.

Thus, in general, a camera-equipped mobile phone comprises a host control module and an image processing module. In other words, the camera-equipped mobile phone is provided with modules to perform image processing on a picked-up image, besides the module to perform the main function of a mobile phone. The reason why such a configuration can be achieved is because it is possible to separate a process for manufacturing an image pickup element and an image processing module and a process for manufacturing a host control module. For example, it becomes possible that a camera maker should manufacture a camera module consisting of an image pickup element and an image processing module and a mobile-phone maker should manufacture a host control module. Further, by separating the modules, it is possible to give general versatility to each of the modules.

Thus, in a camera-equipped mobile phone, an image processing module and a host control module are provided separately. This requires a system to transmit the image data processed by the image processing module to the host control module. In a case where image data picked up by a camera is transmitted by E-mail, for example, it is necessary to first generate JPEG data in the image processing module and transmit the JPEG data to the host control module.

In the background-art camera-equipped mobile phone 100, as shown in FIG. 8, the image processing module 102 records the JPEG data in an SDRAM 103 and the host control module 101 reads out the JPEG data recorded in the SDRAM 103. Alternatively, the JPEG data is transmitted from the image processing module 102 to the host control module 101 by using a host I/F.

Another method is shown in FIG. 9. A background-art camera-equipped mobile phone 110 of FIG. 9 transmits JPEG data by using a YUV data path 104 which connects the image processing module 102 and the host control module 101.

Herein, the image processing module 102 converts YUV image data into JPEG data. With respect to YUV image data which are sequentially inputted, JPEG data are generated and outputted discretely in the time direction. FIG. 10 shows a signal string of YUV image data inputted to a JPEG compression part. The YUV image data is data in which a Y signal and a U signal (or a V signal) are alternately repeated for every clock like Y→U→Y→V→Y→U→Y→V. While the YUV image data for one pixel is supplied to the JPEG compression part for every clock in FIG. 10, the JPEG data is outputted discretely as shown in FIGS. 11 and 12. Reference sign Dout in FIGS. 11 and 12 represents output data and hatched parts represent valid data parts.

The reason why the outputted JPEG data are thus discretely in the time direction is because the data is JPEG-compressed and the data size of the JPEG data becomes smaller than that of YUV image data. Since the compression ratio depends on the content of the image, the timing of outputting data and the data size are not constant.

If image data has a small number of pixels, it is possible to adopt a method in which compressed JPEG data for one frame is once stored in an external memory (in other words, only the valid data part of discrete data is recorded in the external memory) and then sequentially outputted to the YUV data path 104. If image data has a larger number of pixels, however, it is impossible to store JPEG data for one screen in the external memory. If an external memory having very large capacity is used, the cost increases and the power consumption also increases. This is an inevitable problem since the number of pixels in the latest image pickup element is very large.

As one method to solve this problem, conventionally, the JPEG data, which are generated discretely in the time direction, are transmitted to the host control module 101 without any change and the JPEG data are reproduced in the host control module 101 by using a valid signal or an output data clock.

FIG. 11 is a view showing a method to transmit JPEG data by controlling a valid signal. FIG. 11 shows a pixel clock signal (PIXCLK), a frame valid signal (FRAME_VALID), a line valid signal (LINE_VALID) and output data (Dout) which are transmitted from the image processing module 102 to the host control module 101. In this method, in synchronization with the timing of outputting the valid data (JPEG data), the line valid signal is controlled to become High-level. The host control module 101 reads this line valid signal and stores the output data in a memory at the timing where the line valid signal is in High-level. With this operation, the host control module 101 stores only valid data among stream data in the memory to reproduce the JPEG data.

FIG. 12 is a view showing a method to transmit JPEG data by using a pixel clock signal. In this method, in synchronization with the timing of outputting the valid data (JPEG data), the pixel clock signal is outputted, and while the valid data is not outputted, the pixel clock signal is gated. The host control module 101 reads the pixel clock signal and stores the output data in the memory at the timing where the pixel clock signal is inputted. With this operation, the host control module 101 stores only valid data among the stream data in the memory to reproduce the JPEG data.

As discussed above, the background-art camera-equipped mobile phone 100 transmits the JPEG data by using the SDRAM 103, and since an external memory is connected thereto, the cost increases. Further, since the power consumption increases and the device structure becomes larger, there arises another problem of not providing sufficient space for a substrate.

The background-art camera-equipped mobile phone 110 adopts a method to transmit the JPEG data by using the YUV data path 104, and in order to achieve this method, a structure to support the method has to be provided for the host control module 101.

In the method of FIG. 11, for example, the host control module 101 needs a circuit for control to acquire or discard an input signal in accordance with the level of the valid signal. In general, however, most host control modules do not comprise such a circuit.

If the host control module 101 does not allow gating of the pixel clock, the method of FIG. 12 can not be adopted. In a case where the host control module 101 inputs the pixel clock from the image pickup device to a PLL to make a multiple clock, for example, it is impossible to stop the pixel clock.

When the host control module 101 stores the JPEG data which are discretely outputted in the memory without any change like the YUV image data, however, since the valid data and the invalid data are mixed, it is not possible to draw out only the valid data and reproduce the JPEG data.

SUMMARY OF THE INVENTION

The present invention is intended for an image processing apparatus. According to the present invention, the image processing apparatus comprises processing means for compressing an image signal acquired from an image pickup device to output compressed data and an output interface for outputting an uncompressed image signal to the outside of the apparatus, and in the image processing apparatus, the processing means includes means for adding markers before and after a data valid part of compressed data which is outputted discretely in the time direction to encapsulate the compressed data, and the output interface outputs stream data in which encapsulated compressed data appears discretely in the time direction to the outside of the apparatus.

By the present invention, it is possible to transmit the stream data which also includes invalid data to the outside of the apparatus without any change. The image processing apparatus has no necessity of providing a memory having a large capacity to transmit data. Therefore, downsizing of device structure and reduction in cost can be achieved.

According to another preferred embodiment, the image processing apparatus comprises processing means for compressing an image signal acquired from an image pickup device to output compressed data and an output interface for outputting an uncompressed image signal to the outside of the apparatus, and in the image processing apparatus, the processing means includes a buffer for recording therein only a data valid part of compressed data outputted discretely in the time direction and means for adding interval information to a set of data valid parts stored in the buffer to generate encapsulated data of certain size, and the output interface outputs stream data in which encapsulated compressed data appears discretely in the time direction to the outside of the apparatus, and information on the interval until the next encapsulated data is stored as the interval information.

Therefore, it is an object of the present invention to provide a technique to transmit compressed image data among modules, with no upsizing of device structure, reduction in cost and no special control on a control signal among the modules.

These and other objects, features, aspects and advantages of the present invention will become more apparent from the following detailed description of the present invention when taken in conjunction with the accompanying drawings.

DESCRIPTION OF THE PREFERRED EMBODIMENTS

The First Preferred Embodiment

Figure 1:
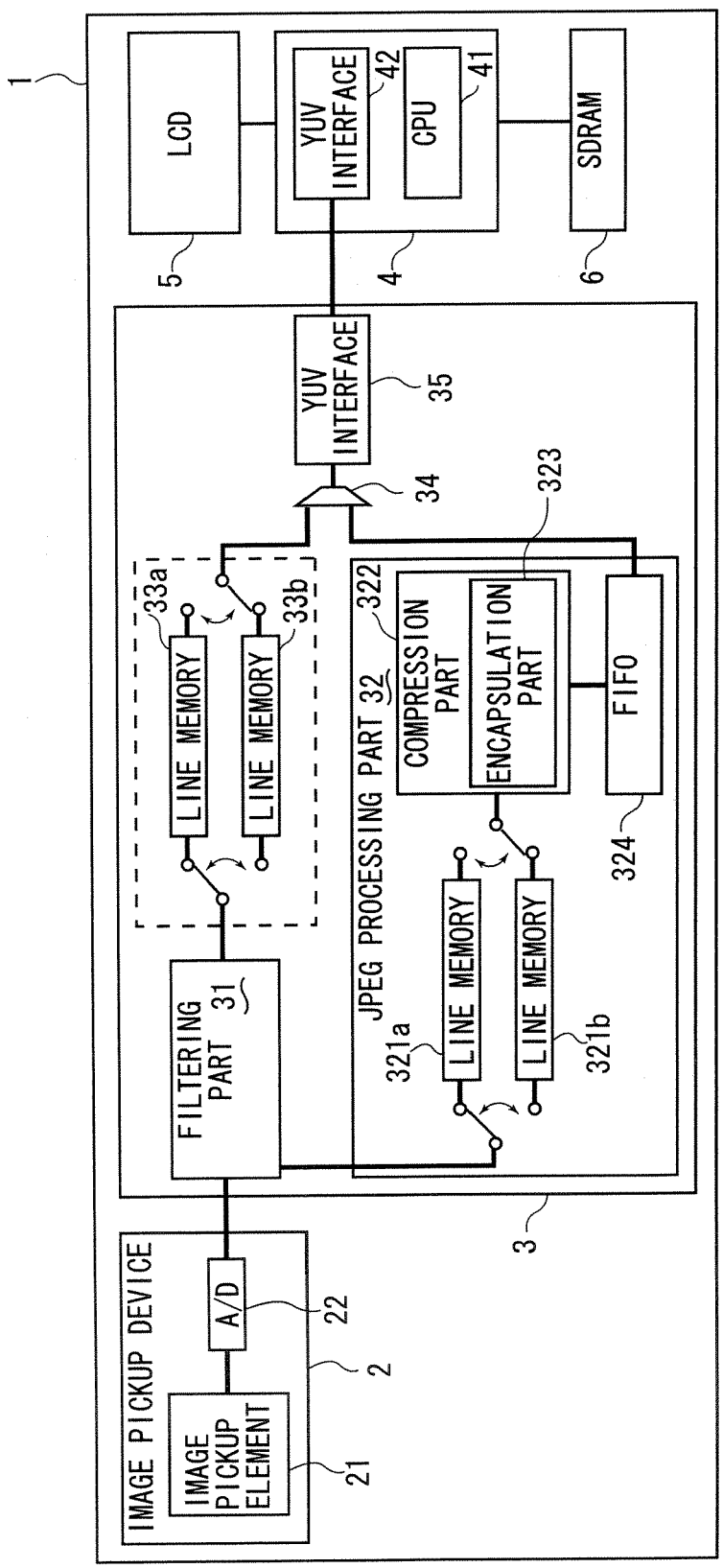
FIG. 1 is a block diagram showing a camera-equipped mobile phone in accordance with a preferred embodiment.

The first preferred embodiment of the present invention will be discussed, referring to figures. FIG. 1 is a block diagram showing a camera-equipped mobile phone 1 in accordance with this preferred embodiment. The camera-equipped mobile phone 1 comprises an image pickup device 2, an image processing module 3, a host control module 4, an LCD 5 and an SDRAM 6. The image processing module 3 is one preferred embodiment of the image processing apparatus in accordance with the present invention. The image processing apparatus comprises a function to perform compression on an image signal, and in the first preferred embodiment, an exemplary case will be discussed, where the image processing module 3 has a JPEG compression function as a compression function.

The image pickup device 2 comprises an image pickup element 21, such as CCD or CMOS, and an A/D converter 22 for converting an analog image data inputted from the image pickup element 21 into digital data. The digital image data outputted from the image pickup device 2 is transmitted to the image processing module 3.

The image processing module 3 comprises a filtering part 31, a JPEG processing part 32, two line memories 33a and 33b, a selector 34 and a YUV interface 35.

The filtering part 31 performs various image processings on the digital image data inputted from the image pickup device 2. For example, a pixel interpolation, a gamma conversion and/or the like are performed. If the image data outputted from the image pickup device 2 is RGB data, the filtering part 31 performs conversion of the RGB data into YUV color space data.

The image data processed in the filtering part 31 is transmitted to the host control module 4 through two methods discussed below. In one method, the image data is transmitted to the host control module 4 as YUV image data for live view. In another method, the image data is transmitted to the host control module 4 as JPEG data for recording or the like.

First, a live view operation will be discussed. The YUV image data from the filtering part 31 is outputted to the selector 34 through the two line memories 33a and 33b. The YUV image data outputted from the filtering part 31 is accumulated in one of the line memories 33a and 33b. Then, at the timing of transmitting the data from one line memory where the YUV image data is accumulated to the selector 34, the YUV image data outputted from the filtering part 31 is accumulated in the other line memory. Thus, by switching between the two line memories 33a and 33b alternately for accumulation and output of the YUV image data, the YUV image data outputted from the filtering part 31 are sequentially outputted to the selector 34.

In the live view, the selector 34 is controlled to output the YUV image data outputted from the line memories 33a and 33b to the YUV interface 35. Therefore, the YUV image data which are sequentially outputted through the filtering part 31 and the line memories 33a and 33b are transmitted to the host control module 4 through the YUV interface 35.

In the host control module 4, a YUV interface 42 inputs the YUV image data for live view thereto. Then, controlled by a CPU 41 and a not-shown LCD controller, the YUV image data which are sequentially inputted are outputted to the LCD 5. With this operation, a user can see an image which is picked up by the image pickup device 2 in real time.

Next, discussion will be made on a method of transmitting the JPEG data, which is a characteristic feature of the present invention. The YUV image data outputted from the filtering part 31 is JPEG-compressed in a compression part 322. In the previous stage of the compression part 322, two line memories 321a and 321b are provided. Each of the line memories 321a and 321b can hold YUV image data for eight lines. At the timing where the YUV image data for eight lines are accumulated in one of the line memories, the YUV image data for eight lines accumulated in the other line memory is supplied to the compression part 322. Then, the compression part 322 performs JPEG compression with the YUV image data for eight lines. Since the JPEG compression is performed by the block consisting of 8×8 pixels, the compression part 322 can thus perform JPEG compression with the data outputted from one of the line memories 321a and 321b which can hold the YUV image data for eight lines. In other words, the JPEG processing part 32 does not need to hold all the YUV image data for one screen in order to perform the JPEG compression.

After the compression part 322 performs the JPEG compression, the compressed JPEG data is outputted. The YUV image data which are outputted alternately from the two line memories 321a and 321b are data which are continuous in the time direction. In contrast to this, the JPEG data outputted from the compression part 322 are data which are discrete in the time direction. The compression part 322 stores the JPEG data which are discretely outputted in an FIFO 324.

Figure 2:
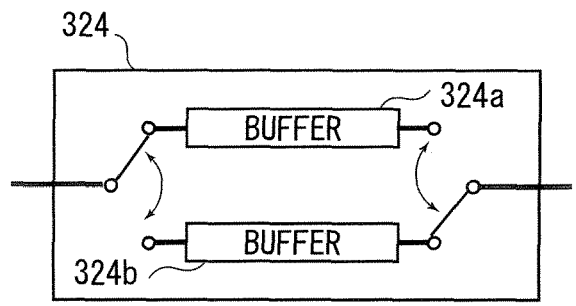
FIG. 2 is a view showing a dual bank FIFO.

FIG. 2 is a block diagram showing the FIFO 324. The FIFO 324 consists of two banks of buffers 324a and 324b. The JPEG data outputted from the compression part 322 is accumulated in one of the buffers 324a and 324b. Then, at the timing where the JPEG data is accumulated in one buffer, the JPEG data accumulated in the other buffer is outputted to the selector 34.

Figure 3:
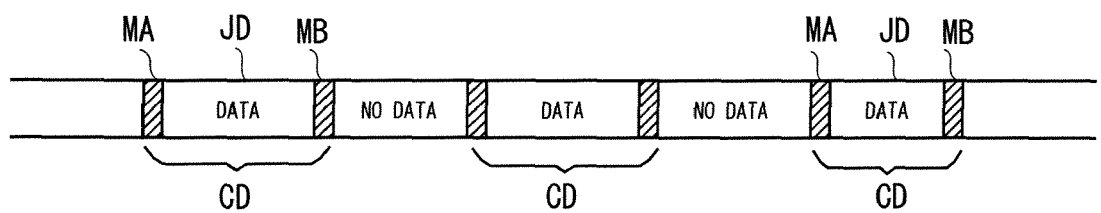
FIG. 3 is a view showing JPEG stream data including encapsulated data.

The compression part 322 stores the compressed JPEG data, in other words, the valid data part in the buffer 324a or 324b. Then, at the point of time when a predetermined amount of valid data are accumulated, an encapsulation part 323 encapsulates the valid data stored in the buffer 324a or 324b. For example, at the point of time when the JPEG data (valid data) for eight bytes are accumulated in the buffer 324a or 324b, the encapsulation part 323 encapsulates the valid data. Specifically, the encapsulation part 323 adds a start marker MA to a start point of a set of valid data which are outputted from the buffer 324a or 324b to the selector 34 and adds an end marker MB to an end of the set of valid data. FIG. 3 is a view showing stream data including encapsulated data CD outputted from the buffer 324a or 324b. As shown in FIG. 3, this stream data includes the encapsulated data CD and invalid data (represented as "NO DATA" in FIG. 3). As discussed above, the encapsulated data CD consists of the start marker MA, the end marker MB and JPEG valid data JD (represented as "DATA" in FIG. 3) encapsulated by these markers MA and MB.

In transmitting the JPEG data, the selector 34 is controlled to output a signal inputted from the buffers 324a and 324b to the YUV interface 35. Therefore, the stream data shown in FIG. 3 is transmitted to the host control module 4 through the YUV interface 35. Thus, in the first preferred embodiment, in the JPEG data transmitted from the image processing module 3 to the host control module 4, which are discrete in the time direction, the markers MA and MB are adds before and after the valid data part.

Figure 4:
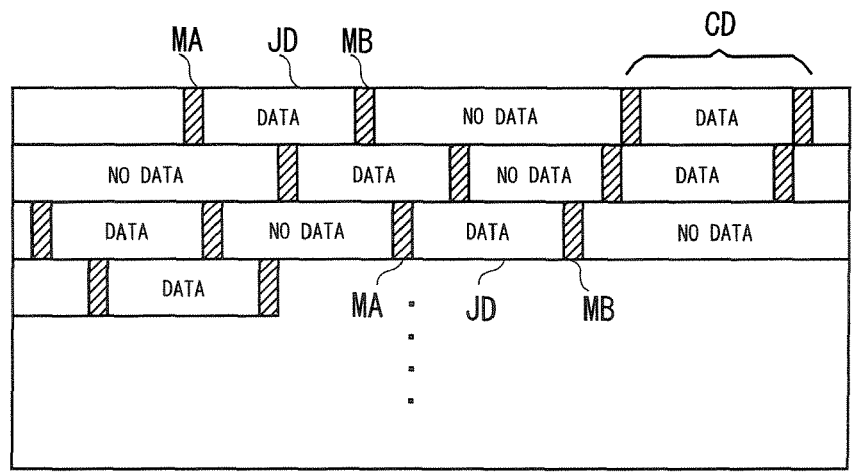
FIG. 4 is a view showing an aspect of JPEG stream data stored in a memory of a host control module.

In the host control module 4, the YUV interface 42 receives the JPEG stream data with the markers. The CPU 41 stores the stream data in the SDRAM 6 without any change. FIG. 4 is a view showing an aspect of the stream data stored in the SDRAM 6. As shown in FIG. 4, in the SDRAM 6, an area in which the encapsulated data CD is recorded and an area in which the invalid data is recorded are mixed.

Then, the CPU 41 searches the data stored in the SDRAM 6 for the start marker MA or the end marker MB to specify the encapsulated data CD and removes the markers MA and MB from the encapsulated data CD to obtain the valid data JD. By searching all the encapsulated data CD and repeating the same operation, all the valid data JD can be obtained to reproduce the JPEG data.

Thus, in the first preferred embodiment, the image processing module 3 transmits the JPEG data outputted discretely in the time direction to the host control module 4 as the stream data including also the invalid data. Therefore, since the image processing module 3 has no necessity of collecting only the valid data part to generate the JPEG data, an SDRAM of large capacity or the like is not needed. Therefore, downsizing of module structure of the image processing module 3 and reduction in cost can be achieved. Since the valid data JD to be transmitted is encapsulated by adding the markers MA and MB, it is possible for the host control module 4 to store the received stream data in the SDRAM 6 without any change and then reproduce the JPEG data. Therefore, it becomes possible to reproduce the JPEG data without controlling the valid signal or gating the pixel clock signal.

Further, in the last encapsulated data CD among the JPEG data for one frame, information indicating that this is the last encapsulated data may be embedded. With this information, it is possible to explicitly indicate the last data of one frame and this increases convenience in the processing of the host control module 4.

If the operating frequency (operating clock) of the image processing module 3 is different from the transmission frequency (transmission clock) in transmission to the host control module 4 by using the YUV interface, since the FIFO 324 can control the timing, this preferred embodiment can be applied to the case where different clocks are used among the modules. In other words, this problem is solved if the FIFO 324 controls the timing of outputting the encapsulated data CD so as to be synchronized with the transmission frequency.

In processing the YUV image data for the above-discussed live view, with increase in the number of pixels of the image pickup device 2, there arises a problem that the transmission frequency of the YUV interface should increase to be very high. The reason is because the power consumption increases and the S/N ratio decreases when the transmission frequency increases. Further, there is sometimes a case where the YUV interface 42 of the host control module 4 can not adapt to the output frequency of the pixel signal in the image pickup device 2.

Figure 5:
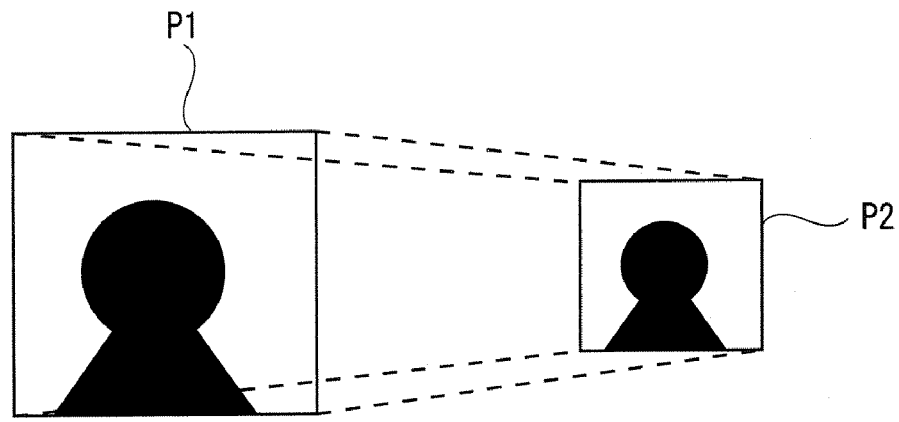
FIG. 5 is a view showing image data which is resized.

In order to solve such problems, in the live view, as shown in FIG. 5, the image processing module 3 resizes the YUV image data and transmits the resized data to the host control module 4. In FIG. 5, P1 represents an image outputted from the image pickup device 2 and P2 represents the resized image. Then, by reducing the size of image data for one screen to be transmitted to the host control module 4, the YUV image data is transmitted at a frequency lower than the output frequency of the pixel signal in the image pickup device 2. With this method, it is possible to decrease the transmission frequency of the YUV interface.

Further, also if the operating frequency of the image pickup device 2 is different from the operating frequency of the YUV interface, this problem can be solved by resizing the YUV image data to decrease the transmission frequency.

The Second Preferred Embodiment

Next, the second preferred embodiment of the present invention will be discussed. An image processing module 3 of the second preferred embodiment has a function to record interval information indicating the interval between the encapsulated data CD in the encapsulated data CD as well as the function of the image processing module 3 of the first preferred embodiment. The interval information indicates the interval between the encapsulated data CD in the JPEG stream data. In other words, the interval information indicates the time period while the invalid data (NO DATA) is transmitted in FIG. 3 or the width of the address of the memory in which the invalid data (NO DATA) is stored in FIG. 4.

Figure 6:
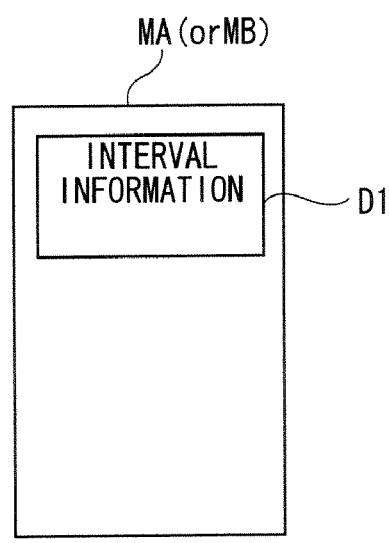
FIG. 6 is a view showing interval information embedded in a marker.

The interval information D1 is embedded in the start marker MA as shown in FIG. 6. Alternatively, the interval information D1 may be embedded in the end marker MB. The interval information D1 has only to be stored at any location in the encapsulated data CD, and for example, it may be inserted between the start marker MA and the valid data JD.

The interval information D1 records the information on the interval until the next encapsulated data CD. The interval information D1 is information on time interval of transmission of the encapsulated data CD or information on address interval in storing the encapsulated data CD in the memory, as discussed above.

Thus, by recording the interval information D1 in the encapsulated data CD, it is possible to increase the operation efficiency in reproduction of the JPEG data by the host control module 4. In other words, since the CPU 41 acquires the first encapsulated data CD stored in the SDRAM 6 and reads the content of the interval information D1 thereof and after that, since it has only to acquire the next encapsulated data CD in accordance with the interval information D1, it is possible to speed up the operation as compared with the case of searching the data stored in all the addresses for the markers.

It has been discussed earlier, however, that the timing of outputting the JPEG data is not constant in the JPEG processing part 32. Therefore, the interval until the next encapsulated data CD can not be always specified for all the encapsulated data CD. Then, the timing of outputting the encapsulated data CD is predicted to some degree and with this prediction, the interval information D1 is written. When prediction can not be made, information indicating that the interval is indefinite is recorded as the interval information D1. When the information indicating the interval until the next encapsulated data CD is recorded as the interval information D1, the host control module 4 may acquire the next encapsulated data CD in accordance with this information. When the information indicating that the interval is indefinite is included, the host control module 4 may search the data for the markers, as discussed earlier in the first preferred embodiment.

Further, the host control module 4 may acquire the encapsulated data CD by using the interval information D1 embedded in the encapsulated data CD or may acquire the encapsulated data CD by searching the data for the markers MA and MB like in the first preferred embodiment. The host control module 4 may selectively perform the above two methods.

The Third Preferred Embodiment

Next, the third preferred embodiment of the present invention will be discussed. An image processing module 3 of the third preferred embodiment has a function to record interval information indicating the interval between the encapsulated data CD in the encapsulated data CD as well as the function of the image processing module 3 of the first preferred embodiment. Unlike the second preferred embodiment, herein, the interval information which is information on the interval from the previous encapsulated data CD is recorded.

Like in the second preferred embodiment, the interval information D1 is embedded in the start marker MA or the end marker MB as shown in FIG. 6. Alternatively, the interval information D1 may be inserted in the other part of the encapsulated data CD.

The interval information D1 records the information on the interval from the previous encapsulated data CD. As the interval information, like in the second preferred embodiment, the time interval or the address interval is specified.

Thus, by recording the interval information D1 in the encapsulated data CD, it is possible to increase the operation efficiency in reproduction of the JPEG data by the host control module 4. In other words, since the CPU 41 acquires the last encapsulated data CD stored in the SDRAM 6 and after that, since it has only to acquire the previous encapsulated data CD in accordance with the interval information D1, it is possible to speed up the operation as compared with the case of searching the data stored in all the addresses for the markers.

In the third preferred embodiment, unlike the second preferred embodiment, it is possible to record the information on the interval from the previous encapsulated data CD as the interval information D1 in all the encapsulated data CD. This is because the interval from the previous encapsulated data CD can be specified without exception while there are some cases where the interval until the next encapsulated data CD can not be predicted.

Further, in the third preferred embodiment, it is necessary to acquire the last encapsulated data CD first. Then, the following methods allow efficient acquisition of the last encapsulated data CD.

As one method, the interval information indicating the interval until the last encapsulated data CD is recorded in the end of the stream data in the one-frame data area. Specifically, as shown in FIG. 3, though the JPEG stream data includes the encapsulated data CD and the invalid data, the interval information indicating the interval until the last encapsulated data CD is recorded in the end of the stream data. With this operation, it is possible to specify the storage position of the last encapsulated data CD without searching the data for the markers MA and MB. As the interval information, like in the above interval information D1, the time interval or the address interval is specified.

As another method, the last encapsulated data CD is recorded in the end of the stream data in the one-frame data area. By this method, it is possible to acquire the last encapsulated data CD immediately from the last of the one-frame data, and it is also possible to specify the storage position of the last encapsulated data CD without searching the data for the markers MA and MB.

The host control module 4 may use the interval information D1 embedded in the encapsulated data CD to acquire the encapsulated data CD or may search the data for the markers MA and MB to acquire the encapsulated data CD like in the first preferred embodiment. These methods may be selectively performed.

The Fourth Preferred Embodiment

In the second and third preferred embodiments, the valid data JD is encapsulated by adding the markers MA and MB thereto and the interval information D1 is embedded therein. In contrast to this, in the fourth preferred embodiment, without adding the markers MA and MB, the encapsulated data CD is formed by only using the interval information D1. Though no marker is added before or after the valid data JD, the valid data JD (or a set of valid data), with the interval information D1 added thereto, is expressed to be encapsulated.

In the fourth preferred embodiment using only the interval information D1, without using the markers, the capsule size of the encapsulated data CD is determined in advance. The image processing module 3 and the host control module 4 perform the operation in accordance with the determined capsule size. Alternatively, the image processing module 3 explicitly notifies the host control module 4 of the capsule size of the encapsulated data CD. Then, the image processing module 3 transmits the encapsulated data CD of certain data size to the host control module 4.

Figure 7:
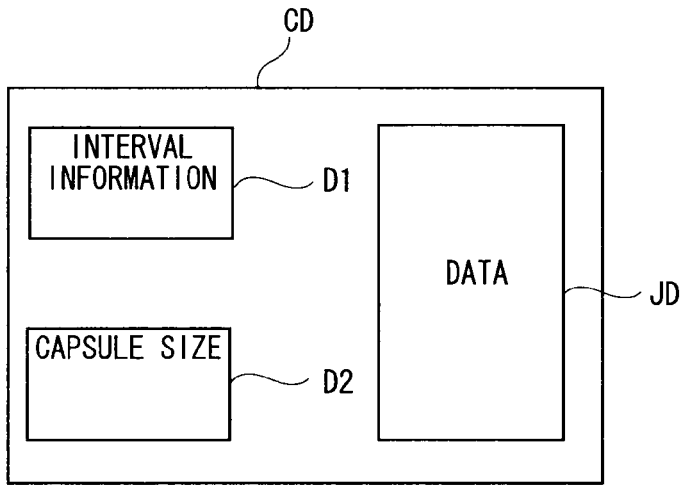
FIG. 7 is a view showing interval information and capsule size embedded in encapsulated data.
Figure 8:
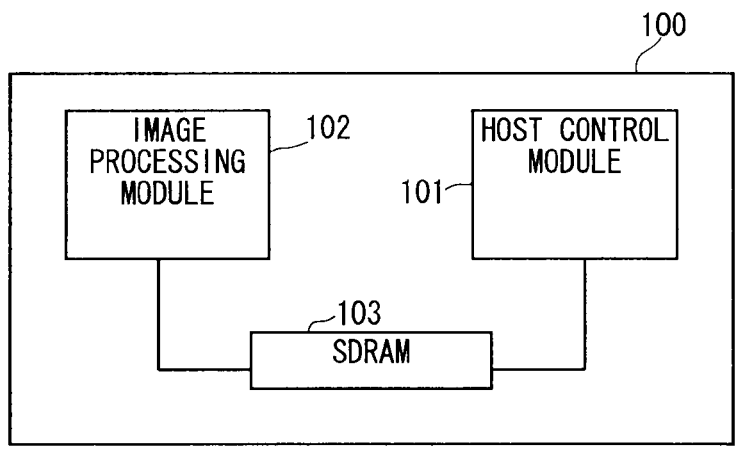
FIG. 8 is a view showing a structure to transmit JPEG data with an SDRAM interposed between modules.
Figure 9:
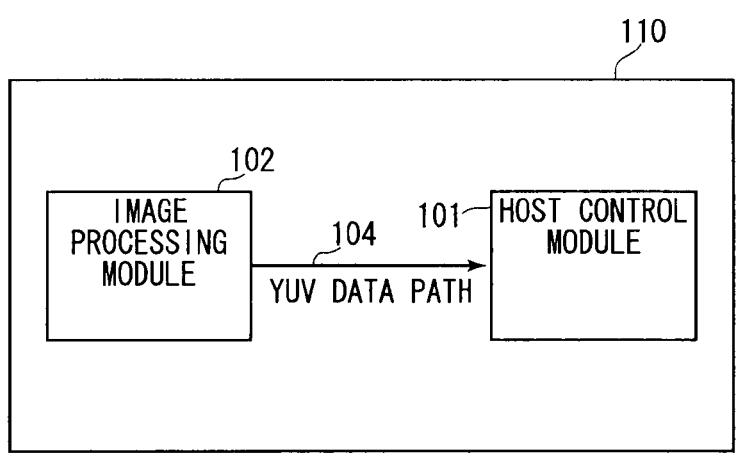
FIG. 9 is a view showing a structure to transmit JPEG data by using a YUV data path.
Figure 10:
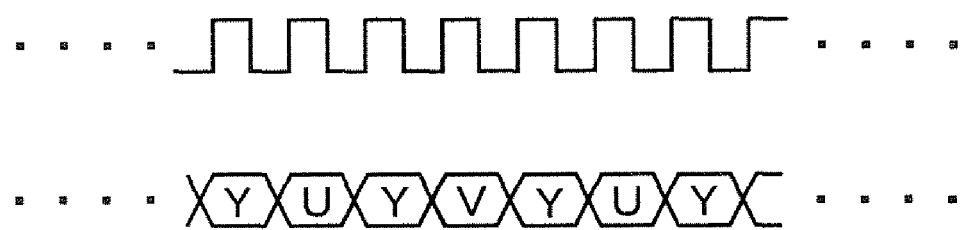
FIG. 10 is a view showing a signal string of YUV image data.
Figure 11:
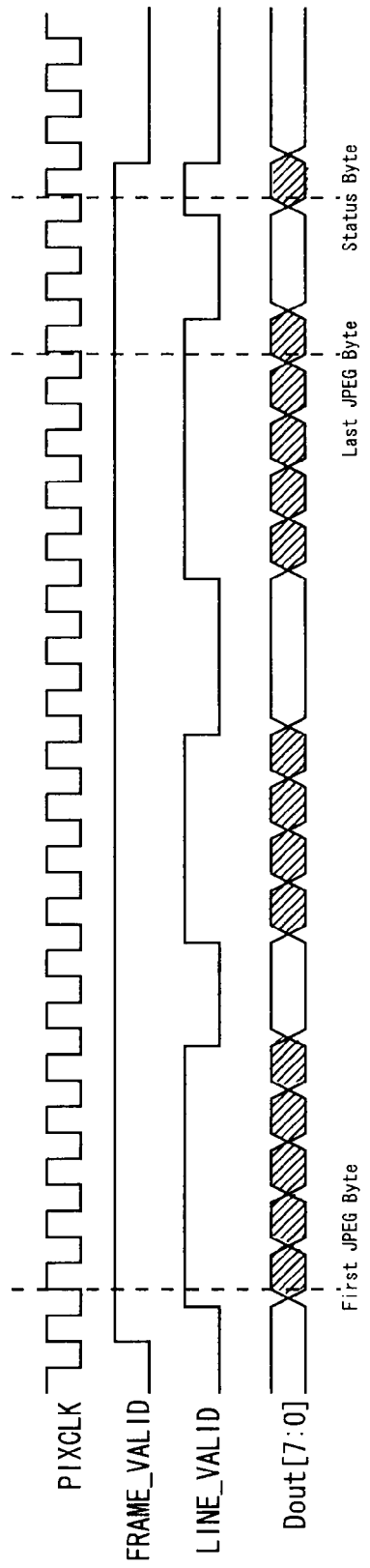
FIG. 11 is a view showing a method to transmit JPEG data by controlling a valid signal.
Figure 12:
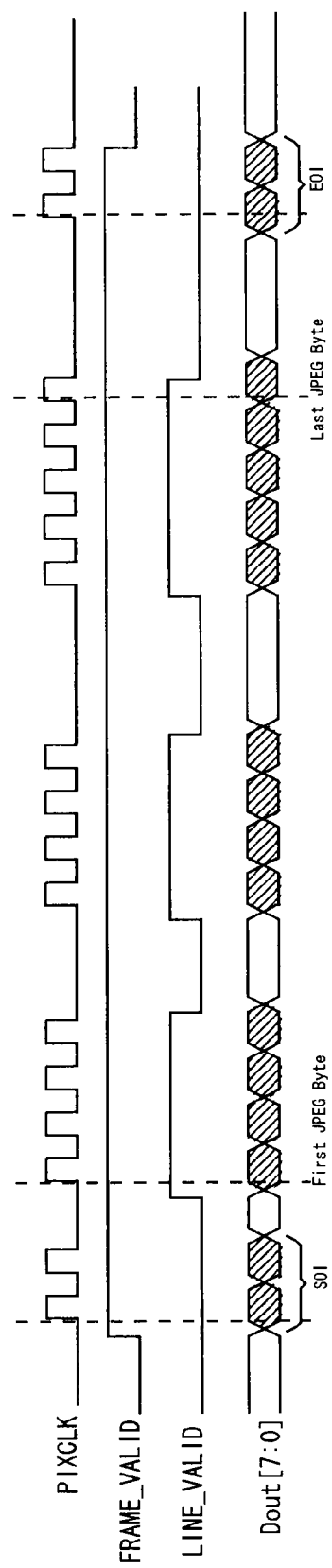
FIG. 12 is a view showing a method to transmit JPEG data by gating a pixel clock signal.

Notification of the capsule size of the encapsulated data CD is made by the following method. In the case where the interval information D1 indicates the interval until the next encapsulated data CD, the capsule size is recorded in the first encapsulated data CD. FIG. 7 is a view showing an aspect of the case where the interval information D1 and the capsule size D2 are recorded in the encapsulated data CD. Since the host control module 4 is thereby notified of transmission interval of the encapsulated data CD by the interval information D1 and further obtains the capsule size from the first encapsulated data CD, the host control module 4 can acquire all the encapsulated data CD.

In the case where the interval information D1 indicates the interval from the previous encapsulated data CD, the capsule size is recorded in the last encapsulated data CD. Since the host control module 4 is thereby notified of transmission interval of the encapsulated data CD by the interval information D1 and further obtains the capsule size from the last encapsulated data CD, the host control module 4 can acquire all the encapsulated data CD. As discussed in the third preferred embodiment, by recording the interval information indicating the interval until the last encapsulated data CD or the last encapsulated data CD in the end of the stream data in one-frame data area, the last encapsulated data CD can be acquired.

With such a system, the host control module 4 reproduces the JPEG data, referring to the interval information D1 of the encapsulated data CD stored in the SDRAM 6. Discussing in more detail, in the case where the information on the interval until the next encapsulated data CD is recorded as the interval information D1, the host control module 4 acquires the interval information on the interval from the first encapsulated data CD to the second encapsulated data CD, to specify the start position of storage address of the second encapsulated data CD. Since the data size of the encapsulated data CD is determined, it is possible to specify the second encapsulated data CD in accordance with the data size. Repeating such operations, all the encapsulated data CD can be acquired. Since the marker MA or MB is not added in the fourth preferred embodiment, however, in order to adopt this method, it is premised that the interval until the next encapsulated data CD should be specified for all the encapsulated data CD.

In the case where the information on the interval from the previous encapsulated data CD is recorded as the interval information D1, the host control module 4 acquires the information on the interval from the previous encapsulated data from the last encapsulated data CD, to specify the start position of storage address of the previous encapsulated data CD. Then, since the data size of the encapsulated data CD is determined, it is possible to specify the previous encapsulated data CD in accordance with the data size. Repeating such operations, it is possible to acquire all the encapsulated data CD. As discussed above, since the interval from the previous encapsulated data CD can be always specified, if the size of the encapsulated data CD is constant, it is possible to reproduce the JPEG data by using only the interval information D1.

Since the JPEG data is reproduced without using the markers in the fourth preferred embodiment, the capsule size of the encapsulated data CD is fixed. Since the last encapsulated data CD is formed of the last fraction data, however, there is sometimes a case where the size of the last encapsulated data CD is different from the determined capsule size. Then, in the last encapsulated data CD, the data size of the last encapsulated data CD may be recorded. Alternatively, in the last encapsulated data CD, the data size of the entire one-frame data may be recorded. Still alternatively, in the last encapsulated data CD, both the data size of the last encapsulated data CD and the data size of the entire one-frame data may be recorded. As another method, the end marker MB is added to only the end of the last encapsulated data CD. By adopting any one of these methods, it is possible to reproduce the JPEG data even if the capsule size of the last encapsulated data CD is different from the determined capsule size.

Also in the second to fourth preferred embodiments, the information indicating that this is the last encapsulated data may be embedded in the last encapsulated data CD among the JPEG stream data for one frame. This makes it possible to explicitly indicate the last data of one frame and this increases convenience in the processing of the host control module 4.

While the invention has been shown and described in detail, the foregoing description is in all aspects illustrative and not restrictive. It is therefore understood that numerous modifications and variations can be devised without departing from the scope of the invention.

What is claimed is:

1. An image processing apparatus comprising:
processing means for compressing an image signal acquired from an image pickup device to output compressed data; and
an output interface for outputting an uncompressed image signal to the outside of said apparatus,
wherein said processing means includes means for adding markers before and after a data valid part of compressed data which is outputted discretely in the time direction to encapsulate said compressed data, and
said output interface outputs stream data in which encapsulated compressed data appears discretely in the time direction to the outside of said apparatus.

2. The image processing apparatus according to claim 1, wherein
said processing means includes a buffer for temporarily storing compressed data therein, and
said processing means encapsulates a set of data valid parts of compressed data stored in said buffer.

3. The image processing apparatus according to claim 1, wherein
said processing means embeds interval information indicating the interval until the next encapsulated data in encapsulated data.

4. The image processing apparatus according to claim 3, wherein
said processing means embeds information indicating that the interval is indefinite in encapsulated data when the interval until the next encapsulated data is not definite.

5. The image processing apparatus according to claim 1, wherein
said processing means embeds interval information indicating the interval from the previous encapsulated data in encapsulated data.

6. The image processing apparatus according to claim 5, wherein
said processing means records interval information indicating the interval until the last encapsulated data in the end of stream data of a one-frame data area.

7. The image processing apparatus according to claim 5, wherein
said processing means records the last encapsulated data in the end of stream data of a one-frame data area.

8. The image processing apparatus according to any one of claims 1 to 7, wherein
said processing means embeds information indicating that this is the last capsule in the last encapsulated data.

9. An image processing apparatus comprising:
processing means for compressing an image signal acquired from an image pickup device to output compressed data; and
an output interface for outputting an uncompressed image signal to the outside of said apparatus,
wherein said processing means includes
a buffer for recording therein only a data valid part of compressed data outputted discretely in the time direction; and
means for adding interval information to a set of data valid parts stored in said buffer to generate encapsulated data of certain size, and
said output interface outputs stream data in which encapsulated compressed data appears discretely in the time direction to the outside of said apparatus, and information on the interval until the next encapsulated data is stored as said interval information.

10. The image processing apparatus according to claim 9, wherein
said processing means embeds a data size of encapsulated data in the first encapsulated data.

11. An image processing apparatus comprising:
processing means for compressing an image signal acquired from an image pickup device to output compressed data; and
an output interface for outputting an uncompressed image signal to the outside of said apparatus,
wherein said processing means includes
a buffer for recording therein only a data valid part of compressed data outputted discretely in the time direction; and
means for adding interval information to a set of data valid parts stored in said buffer to generate encapsulated data of certain size, and
said output interface outputs stream data in which encapsulated compressed data appears discretely in the time direction to the outside of said apparatus, and information on the interval from the previous encapsulated data is stored as said interval information.

12. The image processing apparatus according to claim 11, wherein
said processing means records interval information indicating the interval until the last encapsulated data in the end of stream data of a one-frame data area.

13. The image processing apparatus according to claim 11, wherein
said processing means records the last encapsulated data in the end of stream data of a one-frame data area.

14. The image processing apparatus according to any one of claims 9 to 13, wherein
said processing means embeds a data size of the last capsule in the last encapsulated data.

15. The image processing apparatus according to any one of claims 9 to 13, wherein
said processing means embeds a data size of entire one-frame data in the last encapsulated data.

16. The image processing apparatus according to any one of claims 9 to 13, wherein
said processing means adds a marker to the end of the last encapsulated data.

17. The image processing apparatus according to any one of claims 9 to 13, wherein
said processing means embeds information indicating that this is the last capsule in the last encapsulated data.

18. The image processing apparatus according to any one of claims 3 to 7 or 9 to 13, wherein
said interval information includes time interval information or memory address interval information of encapsulated data.

19. The image processing apparatus according to any one of claims 2, 9 or 11, wherein
the readout of data from said buffer is controlled in synchronization with a transmission frequency of data outputted from said output interface when an operating frequency in said image processing apparatus is different from said transmission frequency.

20. An apparatus connected to an image processing apparatus, wherein
said image processing apparatus comprises
processing means for compressing an image signal acquired from an image pickup device to output compressed data; and
an output interface for outputting an uncompressed image signal to the outside of said apparatus,
wherein said processing means includes means for adding markers before and after a data valid part of compressed data which is outputted discretely in the time direction to encapsulate said compressed data, and
said output interface outputs stream data in which encapsulated compressed data appears discretely in the time direction to the outside of said apparatus,
said apparatus connected to said image processing apparatus, comprising:
an input interface for inputting an uncompressed image signal;
control means; and
a memory, wherein stream data outputted from said output interface of said image processing apparatus is inputted by said input interface and said inputted stream data is stored in said memory, and said control means reproduces compressed data by searching data stored in said memory for said markers.

21. The apparatus connected to an image processing apparatus according to claim 20, wherein said processing means includes means for embedding interval information indicating the interval until the next encapsulated data, and said control means selectively reproduces compressed data by searching data stored in said memory for said markers or reproduces compressed data on the basis of said interval information stored in said encapsulated data.

22. An apparatus connected to an image processing apparatus, wherein said image processing apparatus comprises processing means for compressing an image signal acquired from an image pickup device to output compressed data; and an output interface for outputting an uncompressed image signal to the outside of said apparatus, wherein said processing means includes a buffer for recording therein only a data valid part of compressed data outputted discretely in the time direction; and means for adding interval information to a set of data valid parts stored in said buffer to generate encapsulated data of certain size, and said output interface outputs stream data in which encapsulated compressed data appears discretely in the time direction to the outside of said apparatus, and information on the interval until the next or previous encapsulated data is stored as said interval information, said apparatus connected to said image processing apparatus, comprising:

an input interface for inputting an uncompressed image signal;

control means; and a memory, wherein stream data outputted from said output interface of said image processing apparatus is inputted by said input interface and said inputted stream data is stored in said memory, and said control means reproduces compressed data on the basis of said interval information stored in said encapsulated data.

* * * * *